US008938385B2

(12) United States Patent
Yan et al.

(10) Patent No.: US 8,938,385 B2
(45) Date of Patent: Jan. 20, 2015

(54) METHOD AND APPARATUS FOR NAMED ENTITY RECOGNITION IN CHINESE CHARACTER STRINGS UTILIZING AN OPTIMAL PATH IN A NAMED ENTITY CANDIDATE LATTICE

(75) Inventors: Pengju Yan, Beijing (CN); Yufei Sun, Beijing (CN); Tsuzuki Takashi, Osaka (JP)

(73) Assignee: Panasonic Corporation, Osaka (JP)

( * ) Notice: Subject to any disclaimer, the term of this patent is extended or adjusted under 35 U.S.C. 154(b) by 1705 days.

(21) Appl. No.: 12/300,684

(22) PCT Filed: May 15, 2007

(86) PCT No.: PCT/CN2007/001560
§ 371 (c)(1),
(2), (4) Date: Apr. 3, 2009

(87) PCT Pub. No.: WO2007/137487
PCT Pub. Date: Dec. 6, 2007

(65) Prior Publication Data
US 2009/0326923 A1 Dec. 31, 2009

(30) Foreign Application Priority Data

May 15, 2006 (CN) .......................... 2006 1 0079890

(51) Int. Cl.
G06F 17/27 (2006.01)
G06F 17/28 (2006.01)
G06K 9/00 (2006.01)
G06K 9/22 (2006.01)

(52) U.S. Cl.
CPC .............. *G06F 17/278* (2013.01); *G06K 9/222* (2013.01); *G06F 17/2785* (2013.01); *G06F 17/289* (2013.01)
USPC .................................... 704/9; 704/2; 382/182

(58) Field of Classification Search
CPC .... G06F 17/2785; G06F 17/289; G06K 9/222
USPC ............................................ 704/1, 9, 10, 200
See application file for complete search history.

(56) References Cited

U.S. PATENT DOCUMENTS

| 7,761,437 | B2 * | 7/2010 | Tsuzuki et al. ............... 707/705 |
| 2003/0208354 | A1 | 11/2003 | Lin et al. |
| 2003/0229634 | A1 | 12/2003 | Li |
| 2005/0209844 | A1 * | 9/2005 | Wu et al. ........................... 704/2 |
| 2011/0246076 | A1 * | 10/2011 | Su et al. ........................... 702/19 |

FOREIGN PATENT DOCUMENTS

CN 1352774 A 6/2002

OTHER PUBLICATIONS

International Search Report Dated Aug. 8, 2007.

* cited by examiner

*Primary Examiner* — Farzad Kazeminezhad
(74) *Attorney, Agent, or Firm* — RatnerPrestia

(57) ABSTRACT

The present invention provides a method for recognizing a named entity included in natural language, comprising the steps of: performing gradual parsing model training with the natural language to obtain a classification model; performing gradual parsing and recognition according to the obtained classification model to obtain information on positions and types of candidate named entities; performing a refusal recognition process for the candidate named entities; and generating a candidate named entity lattice from the refusal-recognition-processed candidate named entities, and searching for a optimal path. The present invention uses a one-class classifier to score or evaluate these results to obtain the most reliable beginning and end borders of the named entities on the basis of the forward and backward parsing and recognizing results obtained only by using the local features.

19 Claims, 12 Drawing Sheets

METHOD AND APPARATUS FOR NAMED ENTITY RECOGNITION IN CHINESE CHARACTER STRINGS UTILIZING AN OPTIMAL PATH IN A NAMED ENTITY CANDIDATE LATTICE

BACKGROUND OF THE INVENTION

1. Field of Invention

The present invention relates to language processing methods and systems, and more particularly, to a method and an apparatus for named entity recognition in natural language so as to extract language information and perform corresponding processes.

2. Description of Prior Art

A named entity refers to a set of words including person names, location names, organization names, time, quantity and the like. The recognition of the named entities is widely used in terms of information extraction and information retrieval.

Recently, gradual recognizing methods or chunk recognizing methods for named entity (NE) show a higher performance, which have been described, for example, in *Chunking with Support Vector Machines*, Taku Kudo, Yuji Matsumoto, NAACL, 2001. The major characteristics of these methods are that the recognition is divided into several successive steps, and each step scans one word included in the input sentence and predicts a token of the current word by observing context features of the current word and using a predetermined or stochastic method. Different sets of tokens are used in different methods, but substantially include four types of B, I, E and O, respectively representing a Beginning (B), an Intermediate (I) and an End (E) positions of the named entity and not a named entity (O). After determining the tokens of all the words included in the inputting sentence, the string of all the tokens of B, I, E forms a named entity. In each step of the recognition, the features used by a recognizer are local features included in a feature window centered with the current word.

Table 1 is an example of a method for parsing a sentence from its beginning position to its end position, hereinafter referred to as forward parsing.

TABLE 1

| | PARSING DIRECTION | | | | |
|---|---|---|---|---|---|
| WORDS | $L_2$ | $L_1$ | C | $R_1$ | $R_2$ |
| FEATURES | $F_L^2$ | $F_L^1$ | $F_C$ | $F_R^1$ | $F_R^2$ |
| TOKENS | $T_L^2$ | $T_L^1$ | $T_C$ | N/A* | N/A* |
| | prior words | | current word | posterior words | |

In Table 1, C denotes a current word, $L_1$ and $L_2$ denote left contexts of the current word, and $R_1$ and $R_2$ denote right contexts of the current word. The size of the feature window is 5. $F_C$, $F_L^1$, $F_L^2$, $F_R^1$ and $F_R^2$ are the features corresponding to respective words in the feature window. $T_L^1$ and $T_L^2$ are the recognized tokens of the prior words. N/A denotes that the feature can not be obtained at the current time instant.

The feature denotes all information that can be observed in the contexts, for example, what the word is, the length of the word, part-of-speech (POS) of the word, what the token of the word is according to the prior words, and the like, as shown in following Table 2. It is determined by the system designer in accordance with the characteristics of the applications to use which features, for the purpose of making the system have the highest recognizing performance. In the forward parsing shown in Table 2, when the system observes all these features, it can predict a token of "B-PER" for the current word "邓 (Deng)".

TABLE 2

| | PARSING DIRECTION | | | | |
|---|---|---|---|---|---|
| WORDS | 决心 (decision) | 继承 (inherit) | 邓(DENG) | 小平 (Xiaoping) | 同志 (comrade) |
| FEATURES | {word =决心, length = 2, POS = adverb, token = O} | {word =继承, length = 2, POS = verb, token = O} | {word =邓, length = 1, POS = person name} | {word =小平, length = 2, POS = person name} | {word =同志, length = 2, POS = noun} |
| TOKENS | O | O | B-PER* | N/A | N/A |
| | PRIOR WORDS | | CURRENT WORD | POSTERIOR WORDS | |

In Table 2, the token "B-PER" denotes that the current word is the beginning of a person name.

In the example shown in Table 2, the word "继承 (inherit)" is used as an example, and the features of this word is shown in the 3$^{rd}$ row: the content of the word is "继 承", the length of word is 2, POS of the word is verb, and the token is O (it is not a named entity).

In the foregoing, it can be seen that a drawback of the gradual recognizing method is that only local features in one fixed-size feature window can be used. Since long distance features are not used, it may result in a false alarm of the beginning border (token B). That is, a position which is not a beginning border of a named entity might be recognized as a beginning border by the recognizer.

A method of a variable length model is proposed in *Named Entity Chunking Techniques in Supervised Learning for Japanese Named Entity Recognition*, Manabu Sassano, Takehito Utsuro, COLING 2000: 705-711, in which the size of the feature window can vary in a predetermined range. However, it can be seen that this method can not process features in a range of an arbitrary length either. Some methods based on probabilistic models may use the global features. For example, referring to U.S. patent application Ser. No. 09/403, 069, entitled as "System for Chinese tokenization and named entity recognition", submitted on Feb. 17, 2000. However, the methods based on probabilistic models are greatly influenced by the problem of data sparseness, and need to use complicated decoding methods to search in a huge candidate lattice space. When the training data is insufficient or the computing resources are insufficient (for example, an embedded device), the probabilistic models are not feasible.

In addition, the methods for recognizing named entities in prior art are greatly influenced by erroneous word segmentation. The named entity recognition based on the word segmentation results can not recover the borders incorrectly divided during the word segmentation so that the correctness of the named entity recognition will be influenced. As shown in the example of Table 3, since 北京市|公 安|局长|江|金福" is falsely segmented into "北京市|公安局| 长江|金|福" it directly causes that the phrase "北京市|公安局" is falsely recognized into a named entity of a type ORG (organization name). Actually, there is no named entity in the part '...北京市公安局...' of this sentence, but there is a named entity of a type PER (person name) in the tail of the sentence, i.e. "江金福". At this time, if a character-based model is used, the false due to the erroneous word segmentation can be avoided.

TABLE 3

| CHARACTERS | [HEAD OF SENTENCE] | 北 | 京 | 市 | 公 | 安 | 局 | 长 | 江 | 金 | 福 |
|---|---|---|---|---|---|---|---|---|---|---|---|
| CORRECT WORD SEGMENTATION | | 北京市 | | | 公安 | | 局长 | | 江 | 金福 | |
| PREDICTED WORD SEGMENTATION | | 北京市 | | | 公安局 | | | 长江 | | 金 | 福 |
| PREDICTED POS | | ns | | | n | | | ns | | Ng | n |
| WORD-BASED NAMED ENTITY RECOGNITION | | | | | ORG | | | | | | |

As mentioned above, Kudo et al. select the forward and backward recognition results by using a voting method so as to determine a final token, but the voting results are for the token recognition results of each step, so what are used are still the local features. Additionally, a lot of classifier combination methods are disclosed in other documents. However, the global features are not used in these methods either.

SUMMARY OF THE INVENTION

In view of above-mentioned problems, an object of the present invention is to provide a method and a system for recognizing a named entity included in natural language, which uses global features of candidate named entities, and on the basis of forward and backward parsing results (i.e. the candidate named entities) obtained by only using local features, uses a one-class classifier to score or judge these results to obtain the most reliable beginning and end borders of a named entity.

According to one aspect of the present invention, there is provided a method for recognizing a named entity included in natural language, comprising the steps of: recognizing candidate named entities by a gradual recognizer; extracting character-based global features of the recognized candidate named entities by a refusal recognizer; testing said candidate named entities by using said global features; and if a score of the testing is larger than a predetermined threshold, accepting said candidate named entity, otherwise, refusing the recognition thereof.

According to another aspect of the present invention, there is provided a method for recognizing a named entity included in natural language, comprising the steps of: extracting local features of words or characters included in the center of a feature window by using the feature window; on the basis of a classification model obtained after performing gradual parsing model training with the natural language, gradually parsing and recognizing the natural language so as to obtain information on positions and types of candidate named entities; extracting global features of the candidate named entities included in the center of a feature window by using the feature window; performing a refusal recognition process for the candidate named entities with a refusal recognizer; and generating a candidate named entity network from the refusal-recognition-processed candidate named entities, and performing optimal path searching.

According to a further aspect of the present invention, there is provided an off-line training method for recognizing a named entity included in natural language, comprising the steps of: performing forward gradual parsing model training for a natural sentence to obtain a forward gradual classification model; performing backward gradual parsing model training for the natural sentence to obtain a backward gradual classification model; and performing refusal recognition model training for candidate named entities according to the obtained forward and backward gradual classification models to obtain a refusal recognition model.

According to a further aspect of the present invention, there is provided an on-line training method for recognizing a named entity included in natural language, comprising the steps of: recognizing the natural language with a forward gradual classification model to obtain a forward recognition result; recognizing the natural language with a backward gradual classification model to obtain a backward recognition result; generating a candidate named entity lattice according to said forward and backward recognition results; and calculating an optimal path according to said generated candidate named entity lattice to output a named entity.

According to a further aspect of the present invention, there is provided an off-line training system for recognizing a named entity included in natural language, comprising: a local feature extracting device for having a supplied training text generate a named entity training sample denoted by a feature vector and a sample token; a multiple-class support vector machine training device for training the training text to generate a gradual classification model; a global feature extracting device for having the named entity training sample generate a character-based refusal recognition training sample denoted by a feature vector and a sample token; a one-class support vector machine training device for refusal-recognition-training the obtained refusal recognition training sample to generate a refusal recognition classification model; a training sample memory for storing the training texts used during the training.

According to a further aspect of the present invention, there is provided an on-line training system for recognizing a named entity included in natural language, comprising: a local feature extracting device for having a provided training sample generate a local feature vector; a multiple-class support vector machine recognizing device for recognizing the input text according to the local feature vector of the sample to obtain candidate named entities; a global feature extracting device for extracting a global feature vector for the candidate named entities and the contexts thereof; and a one-class support vector machine recognizing device for recognizing the input candidate named entities according to the global feature vector of the sample, wherein said multiple-class support vector machine recognizing device uses a multiple-class classification model to test the input local feature vector so as to obtain its type token, and forms a candidate named entity according to a string of beginning and continuing tokens belonging to the same type of named entity; and said one-class support vector machine recognizing device uses a one-class classification model to test the input global feature vector so as to obtain its testing score, substrates different thresholds from the obtained testing score to obtain a refusal recognition score, performs an optimal path searching according to the refusal recognition score, and accepts the candidate named entities on the optimal path.

According to the present invention, a method for recognizing a named entity according to a global feature is used so that those unreliable candidate named entities, having unreliable beginning borders or impossible end borders, generated by the gradual named entity recognition method can be refused for recognition. Additionally (Besides?), the character-based feature extraction can prevent the influences due to the erroneous word segmentation. The recognition performance of the named entities can be improved by combining the forward and backward parsing results.

BRIEF DESCRIPTION OF THE DRAWINGS

The above objects, advantages and features of the present invention will be apparent from the following detailed description on the preferred embodiments taken conjunction with the drawings in which.

DETAILED DESCRIPTION OF PREFERRED EMBODIMENTS

Figure 1:
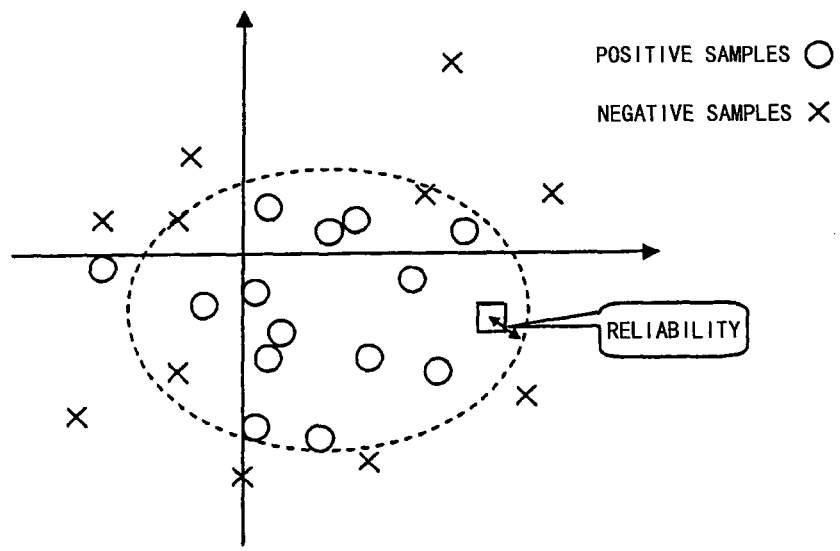
FIG. 1 is a schematic diagram showing that a two-class classifier is used for classification during recognizing the named entities.

Now, the preferred embodiments of the present invention will be described by referring to the drawings, in which those unnecessary details and functions are omitted in order to prevent them from blurring the understanding of the present invention.

First of all, the method of globally modeling the named entities is described for better understanding the present invention.

If one named entity is considered as a whole, then the features of the named entity can be denoted with its left contexts, right contexts and inside features. As shown in the example of Table 4, the features of the target named entity are composed of $F_L^2$, $F_L^1$, $F_{In}^1$, $F_{In}^m$, $F_R^1$, $F_R^2$, as well as the length of the named entity m.

TABLE 4

| WORDS | $L_2$ | $L_1$ | $In_1, In_2, \ldots, In_m$ | $R_1$ | $R_2$ |
|---|---|---|---|---|---|
| FEATURES | $F_L^2$ | $F_L^1$ | $F_{In}^1, F_{In}^2, \ldots, F_{In}^m$ | $F_R^1$ | $F_R^2$ |
| | LEFT CONTEXTS | | INSIDE NAMED ENTITY | RIGHT CONTEXT | |

As compared with the (word) local feature selecting method of the example shown in Table 1, the example of Table 1 focuses on the context features of the current single word, whereas the method of Table 4 focuses on the features of the whole one named entity. As such, no matter what the length of the named entity is, the right context features of the named entity can be always observed. Therefore, in the present invention, such a feature selecting method is referred to as a global feature of a named entity.

Table 5 shows a detailed example of the global feature. In addition to the aforementioned word-based features (for example, what the word is, the length of the word, the POS of the word, and the like), it further includes the length, type and the like of the named entity.

TABLE 5

| WORDS | 决心 (decision) | 继承 (inherit) | 邓 (DENG) 小平 (Xiaoping) | 同志 (comrade) | 的 (of) |
|---|---|---|---|---|---|

TABLE 5-continued

| FEATURES | {word =决心, length = 2, POS = adverb} | {word =继承, length = 2, POS = verb} | {words included = 邓小平) length = 2, type = person name} | {word =同志 length = 2, POS = noun} | {word =的, length = 2, POS = auxiliary word} |
|---|---|---|---|---|---|
| | LEFT CONTEXTS | | INSIDE NAMED ENTITY | | RIGHT CONTEXTS |

The named entity samples in the training set are used to training the global model of the named entities. Two modeling methods can be employed, one is a two-class classifier modeling method, and the other is a one-class classifier modeling method.

The details about the above relevant classifier have already been disclosed in the prior arts. Since the classifiers themselves are not the inventive gist, the detailed description thereof is omitted herein.

Next, the methods for implementing these two modeling methods are described. When the two-class classifier is used, it is required to collect enough positive samples (referring to the named entities in the present invention) and enough negative samples (referring to the non-named entities in the present invention). The features of the positive and negative samples are represented as vectors (or dots) in a multi-dimensional space. The training procedure is to select one two-class classifier to learn and obtain an interface plane of these two kinds of samples. When a new sample is to be tested after completing the training, it is only needed to detect the position of the sample with respect to the interface plane so as to predict whether the sample is a positive sample or a negative sample. Moreover, the distance from the testing sample to the interface plane represents the reliability of the prediction to the sample by the classifier. The further the distance from the interface plane is, the higher the reliability is, otherwise, the lower the reliability is.

As shown in FIG. 1, the positive samples are shown as circles, the negative samples are shown as crosses, and the interface plane is shown as a dotted line. The testing sample within the interface plane will be predicted as a positive sample. On the contrary, the one outside the interface plane will be predicted as a negative sample. The square in FIG. 1 represents a new sample, and the classifier will recognize it as a positive sample.

No matter which classifier is used, there will be always erroneous classification. For example, the interface plane as shown in FIG. 1 makes some areas where the positive samples may appear (outside the interface plane in the present example) to be considered as that only negative samples appear, vise versa. Such erroneous classification is inevitable. When the numbers of the positive and negative samples are not balanced, it will be very difficult to determine the interface plane, which will increase the erroneous classification. The named entity recognition is just such an application. This is because the percentage of the named entities in the whole texts will be less than 10% and further considering the usage of the global features, the number of the negative samples formed from different combinations of the beginning and end borders will be much larger than that of the positive samples. Therefore, the final interface plane will be greatly inclined to the negative samples so that the probability of recognizing a positive sample as a negative sample is greatly increased.

Figure 2:
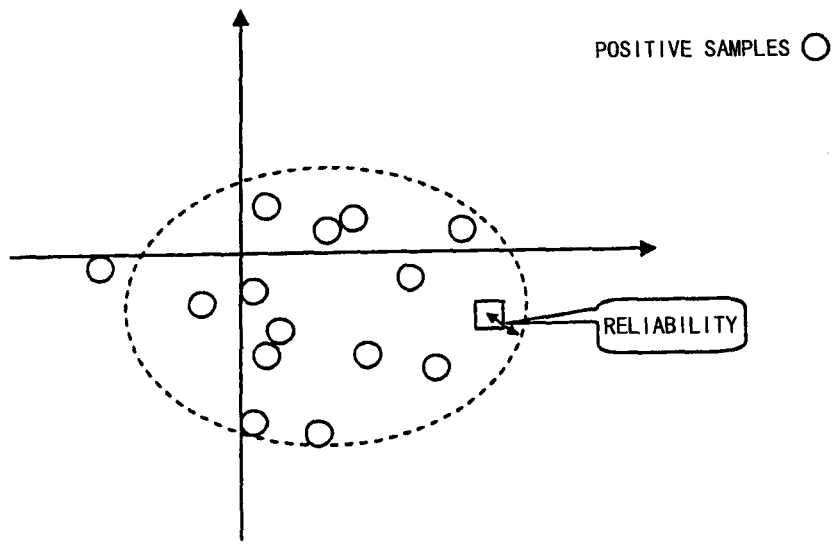
FIG. 2 is a schematic diagram that a one-class classifier is used for classification during recognizing the named entities.

When the one-class classifier is used, it is only required to collect enough positive samples, and the training procedure is to select one one-class classifier to learn and obtain a one-class interface plane. The form and definition of the interface plane are dependent on the selected classifier. At this time, since the selection of the negative samples is avoided, the design of the system is simplified, and the recognition error of the system can be reduced. FIG. 2 shows a classification schematic diagram of using the one-class classifier. In FIG. 2, only the positive samples are collected and therefore the recognition error is reduced.

Based on the above reasons, the present invention uses the one-class model. As one implementation, the present invention suggests to use a one-class Support Vector Machine (One-Class SVM) as a refusal recognition model, which is dependent on the high extending capability, the capability of effectively processing the multi-dimensional and non-linear spaces, and the capability of achieving the high performance with small quantity of training data, of the one-class SVM. In brief, the one-class SVM algorithm tries to look for an optimal super-plane for separating the training data and the coordinate origin. The one-class SVM is described in detailed in *Estimating the Support of A High-Dimensional Distribution*, B. Schölkopf, 3. C. Platt, J. Shawe-Taylor, A. J. Smola, and R. C. Williamson, Neural Computation, 13(7):1443-1471, 2001 and *LIBSVM: A Library for Support Vector Machines*, Chih-Chung Chang and Chih-Jen Lin, 2001.

According to the foregoing, all the global contexts of the candidate named entities can be used by the system no matter what the lengths of the named entities are.

As one embodiment of the present invention, character-based modeling is used. Next, the character-based modeling will be described. As mentioned above, some recognition errors for the named entities are caused by erroneous word segmentation. Therefore, replacing the word-based model with the character-based model may modify this type of recognition errors in performance. Table 6 shows an example of the character-based global feature modeling, in which each feature is a character on the left, right contexts and inside the named entity.

TABLE 6

| CHARACTERS | $ChL_2$ | $ChL_1$ | $ChIn_1, ChIn_2, \ldots, ChIn_m$ | $ChR_1$ | $ChR_2$ |
|---|---|---|---|---|---|
| FEATURES | $F_{ChL}^2$ | $F_{ChL}^1$ | $F_{ChIn}^1, F_{ChIn}^2, \ldots, F_{ChIn}^m$ | $F_{ChR}^1$ | $F_{ChR}^2$ |
| | LEFT CONTEXTS | | INSIDE NAMED ENTITY | RIGHT CONTEXTS | |

Similarly, Table 7 shows a detailed example of the character-based modeling. For example, the features of the character may include whether this character itself can be a word or not, probabilities of appearing as a heading, an intermediate and an end character of a word, and so on.

TABLE 7

| CHARACTERS | 继 | 承 | 邓小平 | 同 | 志 |
|---|---|---|---|---|---|
| FEATURES | {character = 继 be a word = 0, heading = 0.7, intermediate = 0.1, end = 0.2} | {character = 承 be a word = 1, heading = 0.3, intermediate = 0.2, end = 0.4} | {characters included = (邓,小,平) length = 3, type = person name} | {character = 同 be a word = 1, heading = 0.3 intermediate = 0.1, end = 0.6} | {character = 志 be a word = 1, heading = 0.5, intermediate = 0.3, end = 0.2} |
| | LEFT CONTEXTS | | INSIDE NAMED ENTITY | RIGHT CONTEXTS | |

For instant, "承", in Table 7 is used as an example. In its features, a character "承", is shown, that is, the character is "承", whether the character itself can be a word or not is 1, the probability of appearing as a heading character of a word is 0.3, the probability of appearing as an intermediate character of a word is 0.2, and the probability of appearing as an end character of a word is 0.4. As another example, the row, "FEATURES", of the candidate named entity, "邓小平" shows the contents of the characters, length and the type of the named entity.

After the candidate named entity is recognized by the gradual recognizer in the first phase, the refusal recognizer in the second phase extracts the character-based global features of the candidate named entity. Then, with the global features as the input, the one-class SVM is used to test the candidate named entity. If the testing score is higher than a predetermined threshold, the candidate named entity is then accepted. Otherwise, the candidate named entity is refused for recognition. The higher the testing score is, the more reliable the candidate is.

As such, those candidate named entities having unreliable beginning borders (generally, deriving from the forward parsing results) or unreliable end borders (generally, deriving from the backward parsing results) may be refused for recognition.

Simply using the refusal recognition method can not definitely improve the system performance indexed with F-measure (F-measure is a tradeoff of precision and recall), but the precision will be improved. However, according to the present invention, after combining the forward, backward parsing results with the refusal recognition method, the system performance will be greatly improved. The refusal recognition processing procedure may be described as follows.

1. If the forward and backward parsing processes obtain the same candidate named entity, then the candidate is evaluated with the one-class SVM and a threshold $th_{ident}$;
2. If one parsing process obtains one candidate named entity and the other parsing process does not obtain any other named entity which intersects with the obtained candidate in position, then the candidate is evaluated with the one-class SVM and a threshold $th_{free}$;
3. If the forward parsing process obtains one candidate named entity at a position ($B_{fwd}, E_{fwd}$) and the backward parsing process obtains another candidate named entity at a position ($B_{bwd}, E_{bwd}$), and these two candidates intersect with each other in position and have the same type (for example, both are PER), then at most two new candidates of the same type are generated according to the overlapping conditions, with the respective positions of ($B_{fwd}, E_{bwd}$) and ($B_{bwd}, E_{fwd}$). Then the at most four candidates are evaluated with the one-class SVM and a threshold $th_{difbndry}$;
4. If the two parsing processes obtain two candidate named entities which intersect with each other in position but have different types, then the two candidates are evaluated with the one-class SVM and a threshold $th_{cnflct}$;
5. For each input sentence, all the candidate named entities obtained in the first phase forms a lattice, and each candidate named entity on the lattice is attached with score information, i.e. (refusal recognition score=one-class SVM testing score–threshold). On this lattice, a path having a maximum sum of scores is searched by using dynamic programming, and the candidate named entities on this optimal path are accepted and outputted as the final result.

FIGS. 3 to 6 are the schematic diagrams showing the relationship among precision, recall and F-measure when adjusting the above mentioned thresholds. Different effects will be achieved when adjusting the above respective thresholds.

Figure 3:
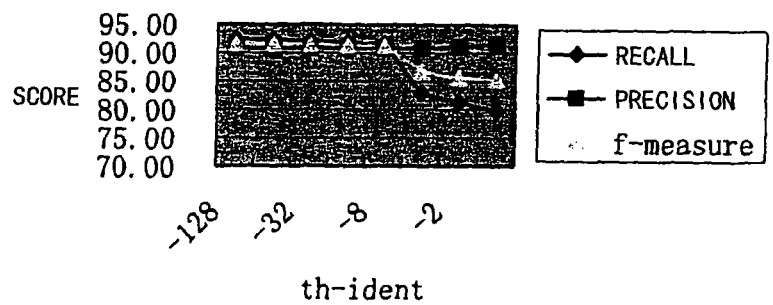
FIG. 3 is a schematic diagram showing the relationship among precision, recall and F-measure when adjusting the thresholds.

The curves shown in FIG. 3 give a case of adjusting the threshold $th_{ident}$ for the identical candidates. When the threshold $th_{ident}$ increases, the precision will be improved a few. However, when $th_{ident}$ is large enough, the recall and F-measure will be greatly reduced.

Figure 4:
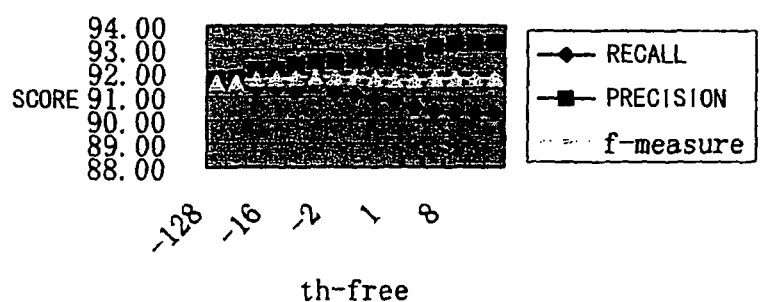
FIG. 4 is a schematic diagram showing the relationship among precision, recall and F-measure when adjusting the thresholds.

The curves shown in FIG. 4 give a case of adjusting the free threshold $th_{free}$. When the threshold $th_{free}$ increases, the precision will be increased steadily. However, when $th_{free}$ exceed a certain value, the precision and recall will be stable, and the F-measure will be increased and then decreased within a small range.

Figure 5:
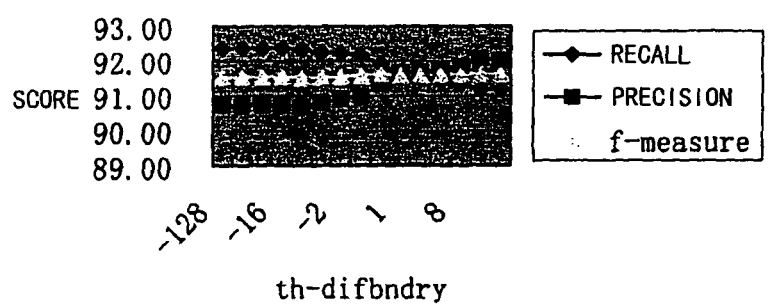
FIG. 5 is a schematic diagram showing the relationship among precision, recall and F-measure when adjusting the thresholds.

The curves shown in FIG. 5 give a case of adjusting the threshold $th_{difbndry}$. When the threshold $th_{difbndry}$ increases, the precision will be increased steadily, whereas the recall will be decreased steadily. However, when $th_{difbndry}$ exceed a certain value, the precision and recall will be stable, and the F-measure will be increased and then decreased a few within a small range.

Figure 6:
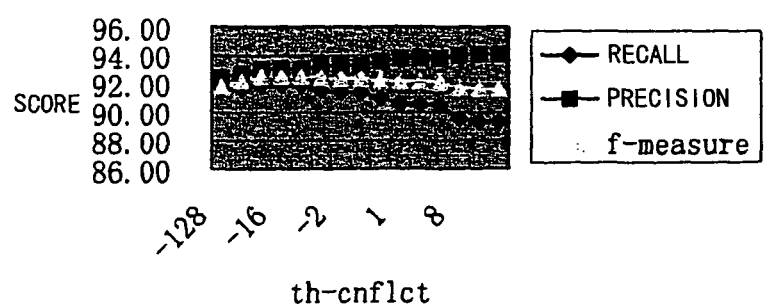
FIG. 6 is a schematic diagram showing the relationship among precision, recall and F-measure when adjusting the thresholds.

The curves shown in FIG. 6 give a case of adjusting the threshold $th_{cnflct}$. When the threshold $th_{cnflct}$ increases, the precision will be increased steadily, whereas the recall will be firstly increased and then decreased, and the F-measure is similar to the recall, i.e., will be firstly increased and then decreased.

If above respective thresholds are replaced by an integrated threshold to easily adjust the system performance, then the overall trends is that with the increasing of the threshold, the precision will be increased, the recall will be decreased, and the F-measure will be firstly increased and then decreased.

From the experiments, the relationships among and changes of the precision, recall and F-measure obtained by adjusting the respective thresholds are specific to the named entity recognition method according to the present invention, and the application of the present invention can be determined thereby.

According to the experimental results on an actual system, the method of the present invention may achieve an error reduction rate of 12.14% as compared with the single parsing results.

In the experiment shown in Table 8, one Chinese data set is used, the training set includes 25,616 named entities, and the testing set includes 27,615 named entities, both of them respectively include 3 types of named entities: person name, location name and organization name.

Herein, the recall, precision and F-measure are defined as follows:

$$recall = \frac{\text{number of named entities correctly recognized by system}}{\text{number of real named entities in testing set}} * 100\%,$$

$$precision = \frac{\text{number of named entities correctly recognized by system}}{\text{number of named entities recognized by system}} * 100\%,$$

$$F\text{-measure} = \frac{2 \times recall \times precision}{recall + precision}.$$

TABLE 8

Experimental Results

| | RECALL (%) | PRECISION (%) | F-MEASURE |
|---|---|---|---|
| FORWARD PARSING | 91.03 | 90.88 | 90.96 |
| BACKWARD PARSING | 91.61 | 91.09 | 91.35 |
| METHOD of PRESENT INVENTION | 91.92 | 92.89 | 92.40 |

With the above data, the error reduction rate achieved by the present invention may be calculated as ((92.40−91.35)/(100−91.35)=12.14%).

As the foregoing, the overall method for the named entities according to the present invention is described. Next, the respective procedures in the method will be described in detail by reference with the drawings.

Figure 7:
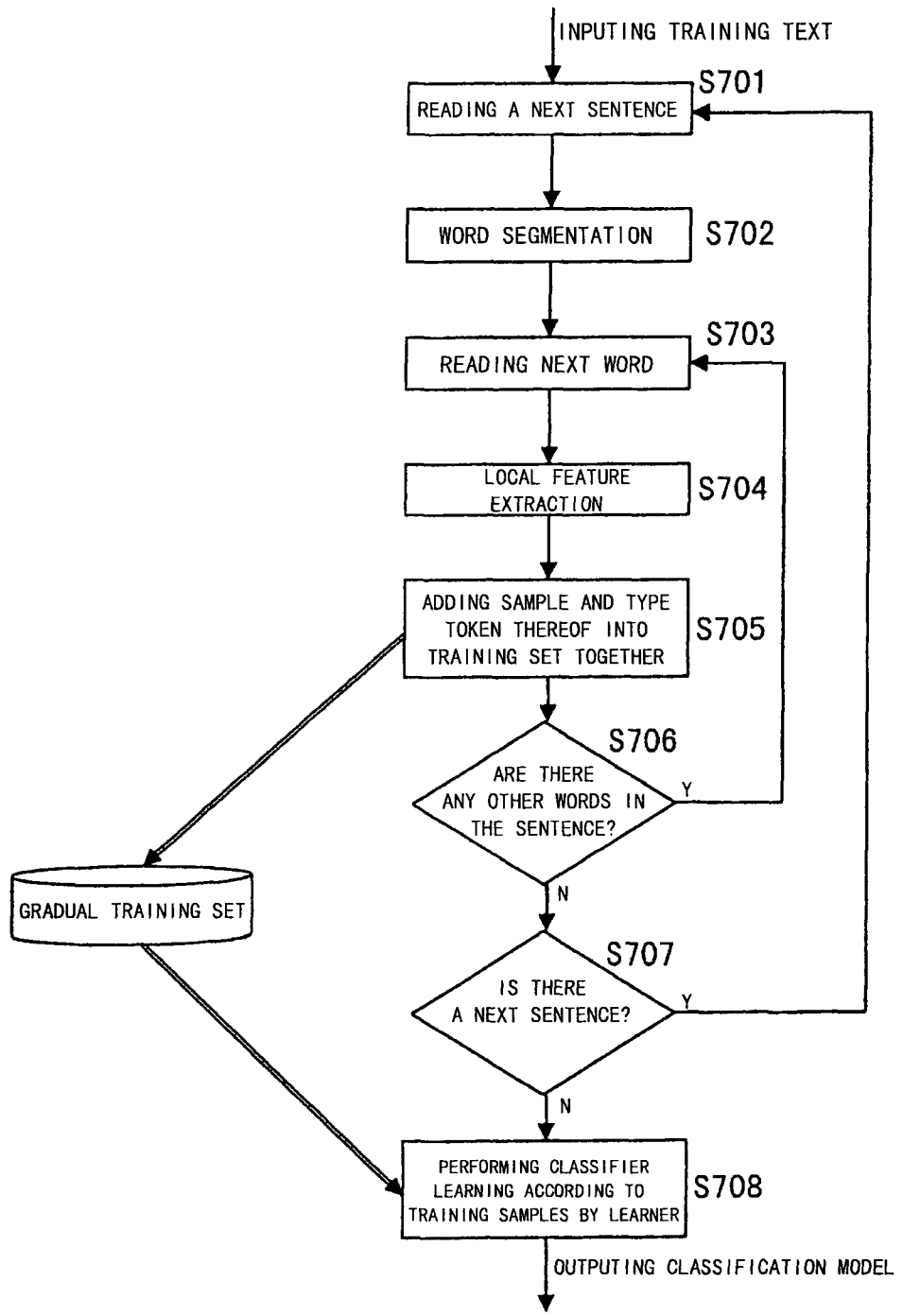
FIG. 7 is a flowchart of a gradual parsing model training procedure during the named entity recognition according to an embodiment of the present invention.

Firstly, the training procedure of the gradual parsing model will be described. The gradual parsing model uses the word-based local features, and uses a multi-class classifier to perform the model learning. FIG. 7 shows the flowchart of the training procedure. At the beginning, a training text is inputted. At step S701, the training procedure of the parsing model reads a next sentence in the input text. Then, at step S702, the word segmentation is performed for the read sentence included in a feature window by using the feature window to find the possible named entities. The feature window is of a fixed or variable size. After completing the segmentation of the current word, a next word is read at step S703. Thereafter, the flow goes to step S704, in which the local feature extraction is performed for the read words or characters included in the feature window to extract the features of the words or characters, e.g., the contents of the words or characters, the lengths of the words or characters, the POS of the words. Next, at step S705, the sample and its token are added into the training set together. At step S706, it is judged whether there are any unrecognized words in the read sentence or not. If yes, the flow returns to the step S704, and the steps S703 to S706 are repeated for the unrecognized words until all the words in the sentence are recognized. If it is judged at the step S706 that all the words in the sentence have been recognized, then the flow goes to step S707 in which it is judged whether there is a next sentence in the text. If the judgment result is positive, i.e., there is a next sentence, then the flow returns to the step S701 to read the next sentence, and then the steps S701 to S707 are repeated to recognize the named entities in the next sentence. If the judgment result of the step S707 is negative, the flow goes to step S708 in which the gradual parsing model training is performed for the natural language, the formed training set is used, and the classifier learning is performed according to the training samples by using a learner. Finally, the classification model is output.

The local feature extraction may include a POS tagging module to obtain the POS corresponding to each word. For each word sample, the feature extracting module obtains a multi-dimensional vector (or dot) representing all the features of the word.

The vectorizing representation of the sample features is a common and normally used technique, and each application may have various representation ways without a uniform definition or method. Herein, only one representation way is described as an example to illustrate the vectorizing of the sample features.

Referring to the previously described Table 2, a sample with "邓 DENG, a Chinese surname)" as its center and a feature window of 5 will be represented. It is assumed that the system vocabulary has 50,000 words, there are 40 kinds of POS for words, there are 10 types of tokens, and the length of the word is one dimension. Thus, for each position in the feature window, 50,000+50+1=50,051 dimensions are preserved; and for the total 5 positions, the total space of the features has 50,051*5=250,255 dimensions. It is assumed that the serial numbers of the words "决心", "继承", "邓", "小平" and "同志" in the vocabulary are 99, 199, 299, 399 and 499 (from 0 to 49,999) respectively. The serial numbers of adverb, verb, person name, verb in the POS are 0, 1, 2 and 3 (from 0 to 39) respectively; and the serial number of the type token "O" in the token types is 0 (from 0 to 9). Then, the feature vector of the sample is as follows:

The $100^{th}$ dimension has a value of 1 (representing the word in the $1^{st}$ position is "决心 (decision)");

The $50,001^{st}$ dimension has a value of 1 (representing the POS of the word in the $1^{st}$ position is adverb);

The $50,041^{st}$ dimension has a value of 1 (representing the type token in the $1^{st}$ position is "O");

The $50,051^{st}$ dimension has a value of 2 (representing the length of the word in the $1^{st}$ position is 2);

The $50,051+200=50,251^{st}$ dimension has a value of 1 (representing the word in the $2^{nd}$ position is "继承 (inherit)");

The $50,051+50,002=100,043^{rd}$ dimension has a value of 1 (representing the POS of the word in the $2^{nd}$ position is verb);

The $50,051+50,041=100,092^{nd}$ dimension has a value of 1 (representing the type token in the $2^{nd}$ position is "O");

The $50,051+50,051=100,102^{nd}$ dimension has a value of 2 (representing the length of the word in the $2^{nd}$ position is 2);

The $100,102+300=100,402^{nd}$ dimension has a value of 1 (representing the word in the $3^{rd}$ position is 邓 (DENG)");

The $100,102+50,003=150,105^{th}$ dimension has a value of 1 (representing the POS of the word in the $3^{rd}$ position is person name);

The $100,102+50,051=150,153^{rd}$ dimension has a value of 1 (representing the length of the word in the $3^{rd}$ position is 1);

The $150,153+400=150,553^{rd}$ dimension has a value of 1 (representing the word in the $4^{th}$ position is "小平 (Xiaoping)");

The 150,153+50,003=200,156$^{th}$ dimension has a value of 1 (representing the POS of the word in the 4$^{th}$ position is person name);

The 150,153+50,051=200,204$^{th}$ dimension has a value of 2 (representing the length of the word in the 4$^{th}$ position is 2);

The 200,204+500=200,704$^{th}$ dimension has a value of 1 (representing the word in the 5$^{th}$ position is "同志 (comrade)");

The 200,204+50,004=250,208$^{th}$ dimension has a value of 1 (representing the POS of the word in the 5$^{th}$ position is verb);

The 200,204+50,051=250,255$^{th}$ dimension has a value of 2 (representing the length of the word in the 5$^{th}$ position is 2); and Other dimensions have the value of 0.

It shall be noted that in the flows, for the classification model training required by the forward parsing, "a next word" refers to one word immediately in the right of the current word, whereas for the backward parsing, "a next word" refers to one word immediately in the left of the current word.

It is not limited which kind of multi-class classifier is used. As one implementation, the SVM can be used. The training and recognizing formulas for the two-class SVM are as follows:

For a given training set $\{x_i, y_i\}_{i=1}^{l}, x_i \in R^n, y_i \in \{-1, 1\}$, i=1, . . . , l, in which $x_i$ represents the feature vector of the training sample, $y_i$ represents the type token of the training sample, the predicting formula to a new sample x of the SVM can be given by Equation (1).

$$y = sgn\{<w,x>-b\} \quad (1)$$

wherein w is obtained by solving the following second-order programming:

$$\min \frac{1}{2}\|w\|^2 + C\sum_{i=1}^{n} \xi_i$$

$$\text{s.t.} \quad y_i[(w \cdot x_i) + b] - 1 + \xi_i \geq 0, i = 1, \ldots, n.$$

If the above classification problem is linear inseparable, then the SVM uses an implicit mapping $x \rightarrow \Phi(x)$ to map this problem into a higher-dimensional space for seeking a better separability in that space. Actually, the mapping function $\Phi$ will not appear alone, but is reflected in the inner product calculations during the optimization, that is, it is represented by the following equation.

$$k(x_1, x_2) = <\Phi(x_1), \Phi(x_2)>$$

Herein, $k(x_1, x_2)$ is referred to as kernel function to replace the inner product present in all the equations.

Since the SVM is used to solve the two-class classification problem, when solving a multi-class problem (e.g. k), k(k−1) two-class SVM classifiers need to be constructed, and thus when testing, a voting method is used to determine the type token of the new sample. One simple voting strategy is to decide by a majority vote, i.e., the type token having the most votes is assigned to the new sample.

Figure 8:
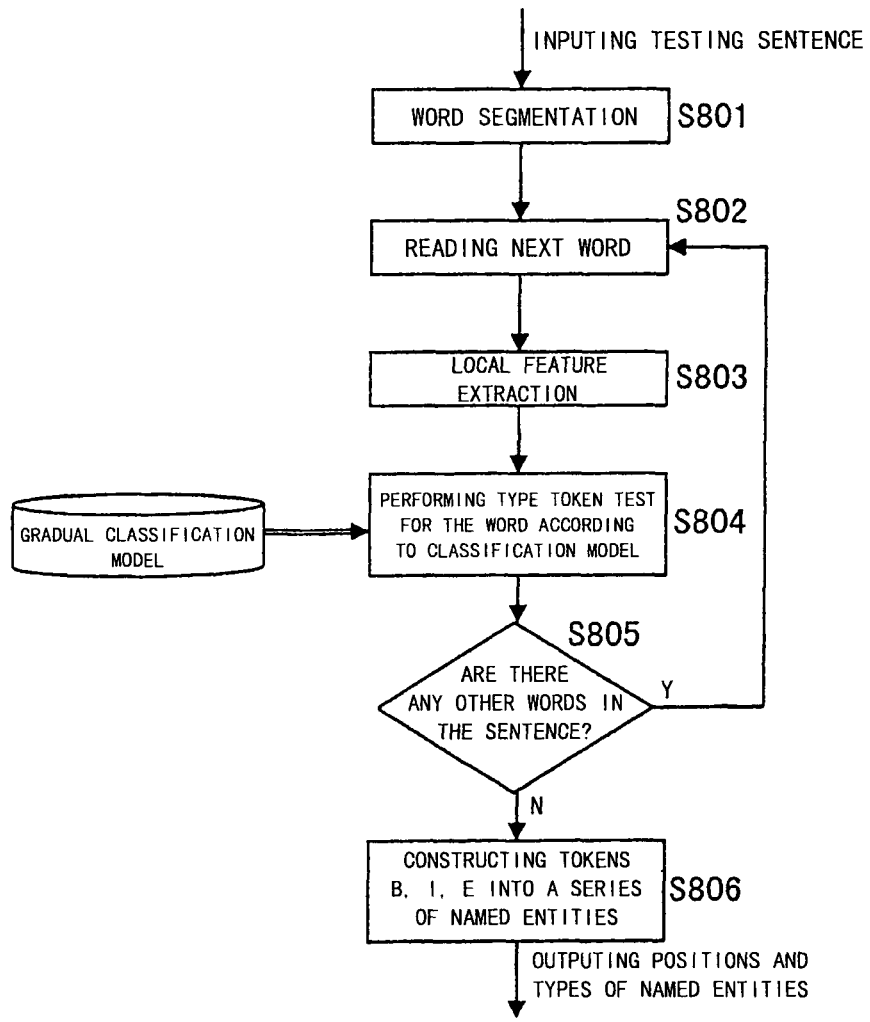
FIG. 8 is a flowchart of the gradual parsing and recognition during the named entity recognition according to an embodiment of the present invention.

FIG. 8 is a flowchart showing the gradual parsing and recognizing procedure according to the embodiment of the present invention. Next, the gradual parsing and recognizing procedure will be described in conjunction with FIG. 8. At step S801, word segmentation is performed for the input testing sentence included in a feature window by using the feature window to find the possible named entities. The feature window is of a fixed or variable size. After completing the segmentation of the current word, a next word is read at step S802. Thereafter, the flow goes to step S803, in which the local feature extraction is performed for the read words included in the feature window, and the features of the word is parsed based on these local features, e.g., the contents of the words, the lengths of the words, the POS of the words. Next, at step S804, the classification model is obtained according to the procedure shown in FIG. 7, and the type token is predicted for the current word. Thereafter, at step S805, it is judged whether there are any unrecognized words in the read sentence or not. If yes, the flow returns to the step S802, and the steps S802 to S805 are repeated for the unrecognized read words until all the words in the testing sentence are recognized. If it is judged at the step S805 that the words in the testing sentence have been recognized, then the flow goes to step S806 in which the tokens of B, I and E given for the named entities are formed into a string of named entities. Thereafter, the positions and types of the named entities are output.

It should be noted that the feature extracting module in the gradual parsing and recognizing procedure is consistent with that in the gradual parsing model training procedure. Additionally, it should be further noted that for the forward parsing, "a next word" refers to one word immediately in the right of the current word, whereas for the backward parsing, "a next word" refers to one word immediately in the left of the current word.

As for the prediction formulas of the type tokens, it may be referred to the above descriptions for the gradual parsing model training procedure.

After obtaining the tokens of B, I, E and O, the continuous string of tokens B, I, I, . . . , I, E is encapsulated into a named entity.

Figure 9:
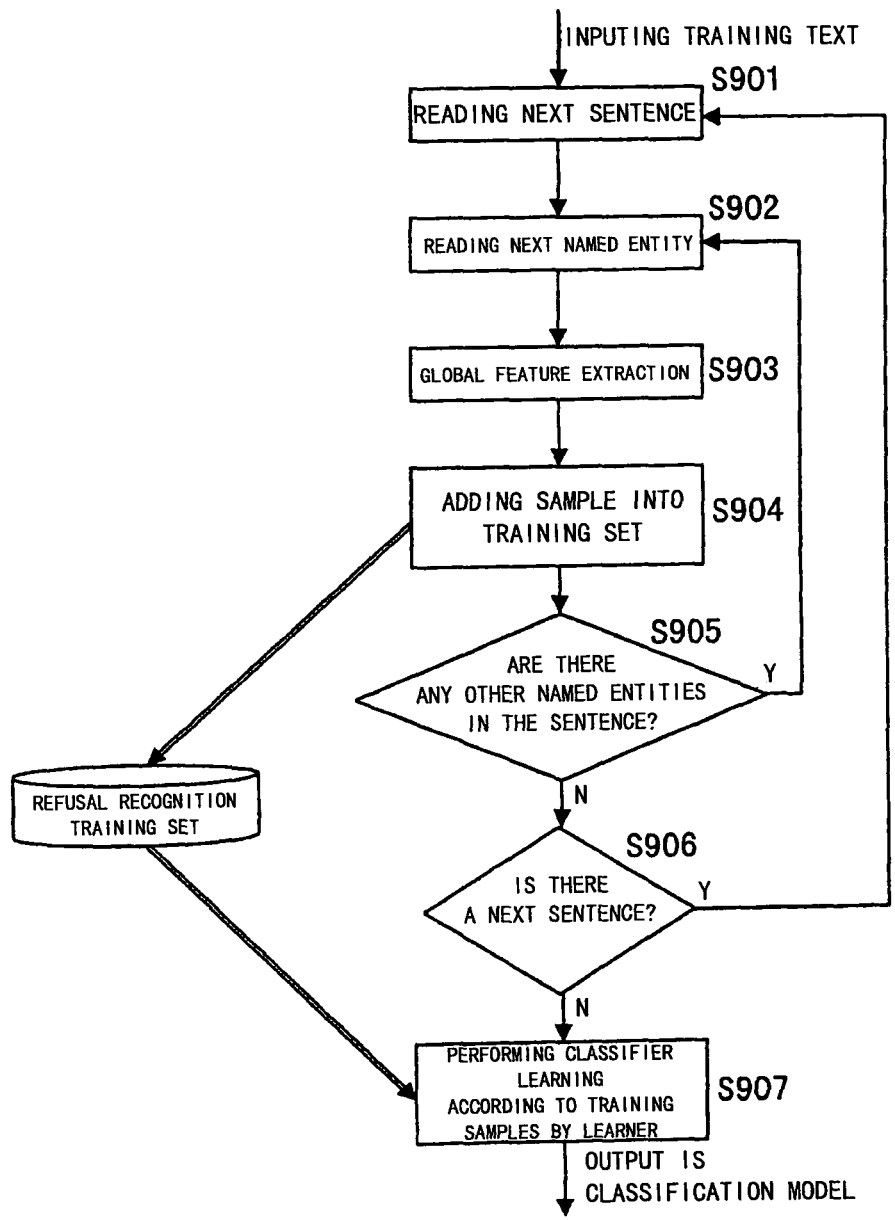
FIG. 9 is a flowchart of a refusal recognition model training procedure during the named entity recognition according to an embodiment of the present invention.

After obtaining the candidate named entities, a refusal recognizer will be used to perform a refusal recognition process for the candidate named entities. The refusal recognition model training procedure will be described in reference with FIG. 9.

At the beginning, a training text is inputted. At step S901, the training procedure of the refusal recognition model reads a next sentence in the input text. Then, at step S902, candidate named entities in the current sentence are read. Thereafter, at step S903, the global feature extraction is performed for the read candidate named entities included in a feature window by using the feature window. For example, the contents of the words, the lengths of the words, the POS of the words are extract. Next, the flow goes to step S904 in which the processed sample is added into the refusal recognition training set. The feature window is of a fixed or variable size. In the refusal recognition training set, the model obtained with learning is used on the one-class classifier to perform the refusal recognition process for the obtained global features. During the refusal recognition process, the refusal recognizer extracts the candidate named entities, calculates scores representing the precisions of these candidate named entities, and accepts or refuses the candidate named entities for recognition according to the calculated scores. Thereafter, at step S905, it is judged whether there are any candidate named entities which are not refusal-recognition-processed in the read sentence or not. If yes, the flow returns to the step S902 to read the next candidate named entity, and the steps S902 to S905 are repeated for the read candidate named entity until all the candidate named entities in the sentence are refusal-recognition-processed. If it is judged at the step S905 that the candidate named entities in the sentence have been processed, then the flow goes to step S906 in which it is judged whether there is a next sentence in the input training text. If the judgment is positive, i.e., there is a next sentence, the flow returns to the step S901 to read the next sentence, and then the steps S901 to S906 are repeated to perform the refusal recognition process for the candidate named entities in the next sentence. If the judgment of the step S906 is negative, the flow goes to step S907 in which the formed refusal recognition training set is used, and the classifier learning is performed according to the training samples by using a learner. Finally, the classification model is outputted.

The refusal recognition model uses the character-based global features of the named entities and the one-class classifier to perform the model learning. For each named entity sample, the feature extracting module obtains one multi-dimensional vector (or dot) representing all the features of the named entity. The obtained multi-dimensional vectors are classified by using the gradual classification model. The feature vectorizing representation used herein is similar to the above described one, and thus the detailed descriptions thereof are omitted.

Since the one-class classifier indicates the reliabilities of a single kind of samples, therefore for different kinds of named entities (such as person name, location name and organization name), different training sets will be used, and different refusal recognition models will be obtained through training.

In the present invention, the kinds of one-class classifier are not limited. As one implementation, one-class SVM can be used. *LIBSVM: A Library for Support Vector Machines*, Chih-Chung Chang and Chih-Jen Lin, 2001. Corresponding software describes the training and recognizing formulas for the one-class SVM problem as follows:

For a given training set $x_i \in R^n$, the formula to score a new sample x of the SVM is:

$$\sum_{i=1}^{l} \alpha_i k(x_i, x) - \rho,$$

wherein the $\alpha_i$ is obtained by solving the following second-order programming:

$$\min_{\alpha} \frac{1}{2} \alpha^T Q \alpha$$
$$s.t. \ 0 \leq \alpha_i \leq 1/(vl), i = 1, \ldots, l, e^T \alpha = 1,$$

in which $Q_{ij} = k(x_i, x_j) \equiv \langle \Phi(x_i), \Phi(x_j) \rangle$

Figure 10:
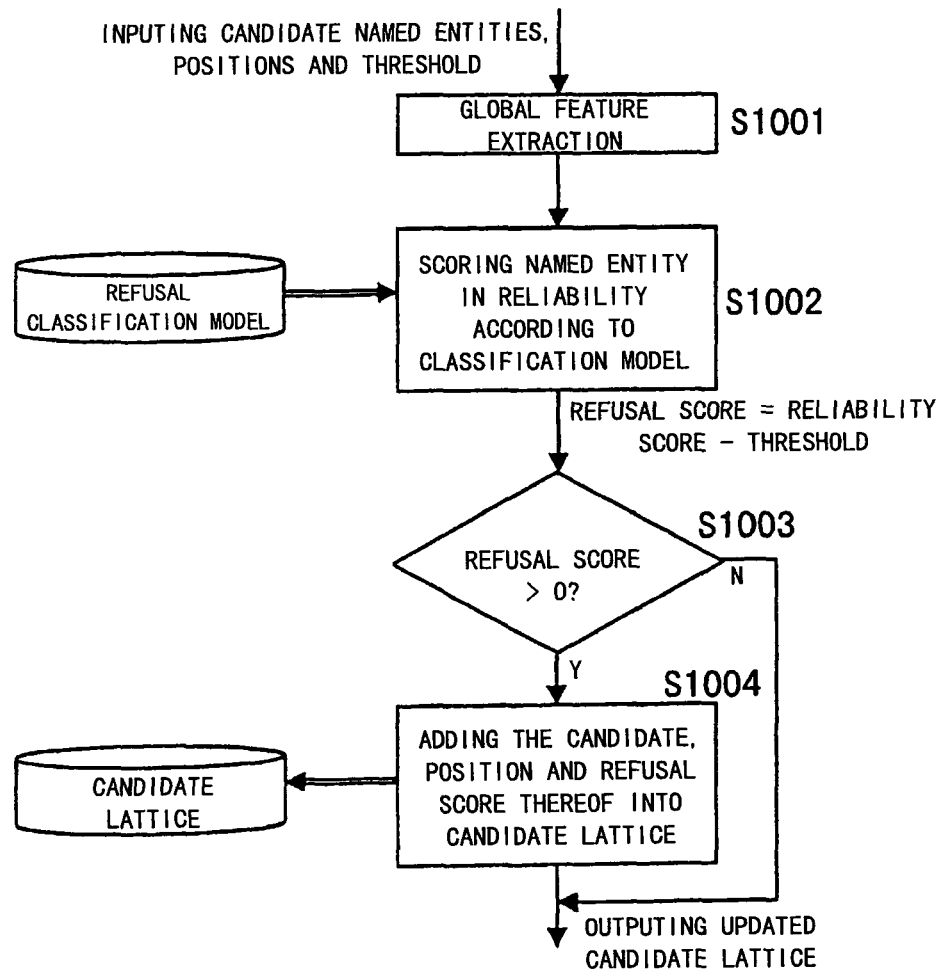
FIG. 10 is a flowchart of refusal recognition scoring during the named entity recognition according to an embodiment of the present invention.

After obtaining the refusal recognition training set, the candidate named entities are scored based on the refusal recognition training set. FIG. 10 shows the flowchart of scoring the candidate named entities. Referring to FIG. 10, the procedure for scoring the candidate named entities is described as below.

Firstly, a candidate named entity, its position and a relevant threshold are inputted. At step S1001, the global feature extraction is performed for the candidate named entity. Thereafter, at step S1002, according to the refusal recognition classification model obtained through the procedure shown in FIG. 9, the candidate named entity is scored for the reliability thereof. As mentioned above, the refusal recognition score=the reliability score−the threshold. Next, at step S1003, it is judged whether the refusal recognition score is larger than 0 or not. If the refusal recognition score is larger than 0, then the flow goes to step S1004, the candidate named entity, its position and the refusal recognition score information are added into the candidate named entity lattice and the updated candidate lattice is output. If it is judged at the step S1003 that the refusal recognition score is not larger than 0, then the updated candidate lattice is directly output.

The feature extracting module in the scoring procedure is consistent with that in the refusal recognition module training procedure.

The predicting formula for the reliability scoring may be referred to the above descriptions.

Figure 11:
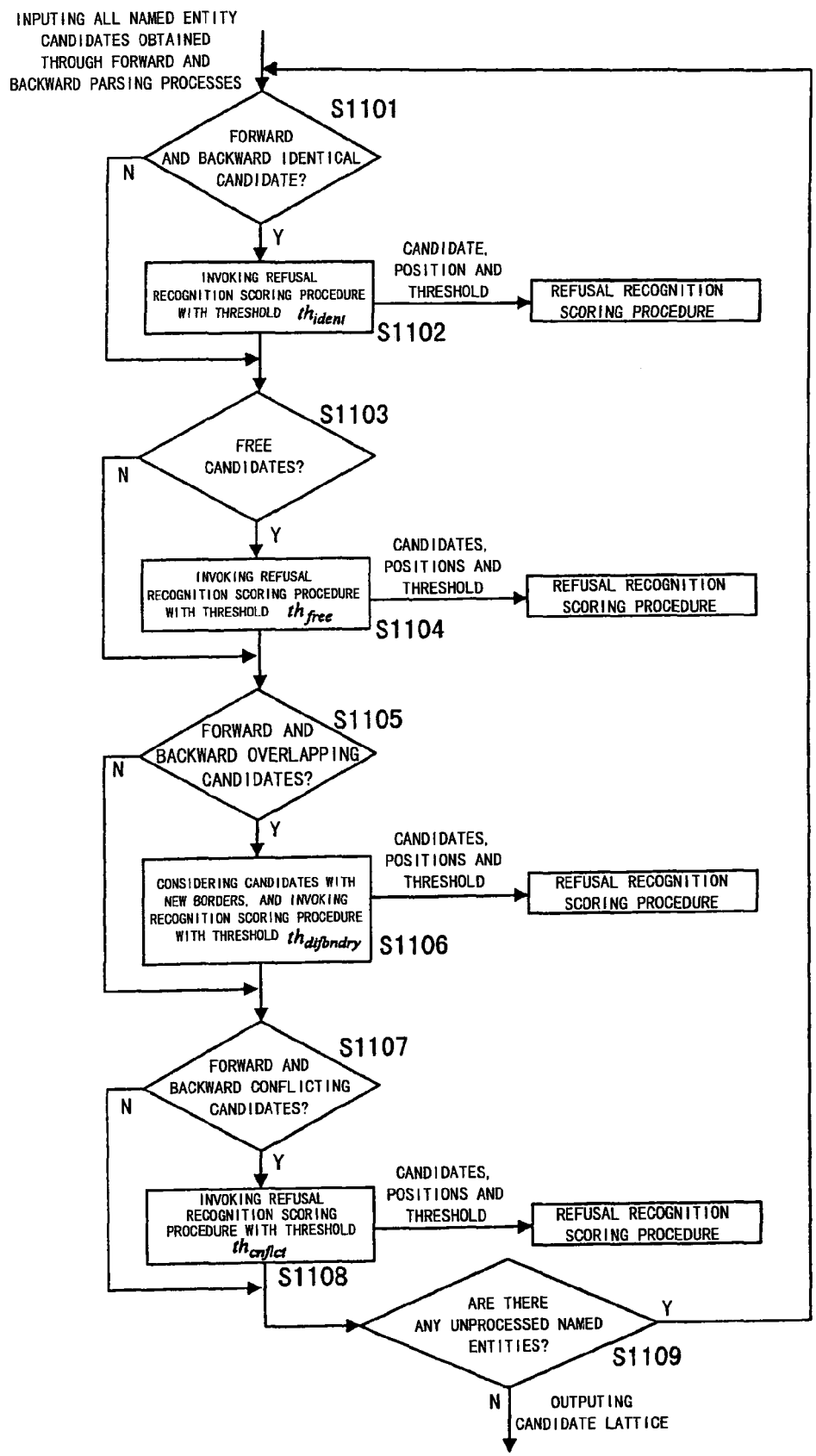
FIG. 11 is a flowchart of generating a candidate named entity lattice during the named entity recognition according to an embodiment of the present invention.

Next, the lattice generation procedure will be described by referring to FIG. 11. Firstly, all the candidate named entities obtained through the forward and backward parsing processes are inputted. At step S1101, it is judged whether the candidates obtained through the forward and backward parsing processes are the same candidate or not. If yes, at step S1102, the threshold $th_{ident}$ for the identical candidate is used to invoke the refusal recognition scoring procedure, and the candidate named entity, its position and the threshold $th_{ident}$ for the same candidate are provided to the refusal recognition scoring procedure for performing the refusal recognition scoring procedure. Thereafter, the flow goes to step S1103. It should be noted that if the judgment at the step S1101 is negative, the processing flow will also go to the step S1103 to judge whether the candidates obtained through the forward and backward parsing processes are free candidates or not. If yes, at step S1104, the threshold $th_{free}$ for the free candidates is used to invoke the refusal recognition scoring procedure, and the candidate named entities, their positions and the threshold $th_{free}$ for the free candidates are provided to the refusal recognition scoring procedure for performing the refusal recognition scoring procedure. Thereafter, the flow goes to step S1105. It should be noted that if the judgment at the step S1103 is negative, the processing flow will also go to the step S1105 to judge whether the candidates obtained through the forward and backward parsing processes are overlapping candidates or not. If yes, at step S1106, the threshold $th_{difbndry}$ for the overlapping candidates is used to invoke the refusal recognition scoring procedure, and the candidate named entities, their positions and the threshold $th_{difbndry}$ for the overlapping candidates are provided to the refusal recognition scoring procedure for performing the refusal recognition scoring procedure. Thereafter, the flow goes to step S1107. It should be noted that if the judgment at the step S1105 is negative, the processing flow will also go to the step S1107 to judge whether the candidates obtained through the forward and backward parsing processes are conflicting candidates or not. If yes, at step S1108, the threshold $th_{cnflct}$ for the conflicting candidates is used to invoke the refusal recognition scoring procedure, and the candidate named entities, the positions and the threshold $th_{cnflct}$ for the conflicting candidates are provided to the refusal recognition scoring procedure for performing the refusal recognition scoring procedure. Thereafter, the flow goes to step S1109. It should be noted that if the judgment at the step S1107 is negative, the processing flow will also go to the step S1109. At the step S1109, it is judged whether there are any unprocessed candidate named entities. If yes, the flow returns to the step S1101, and the steps S1101 to S1109 are repeated. If it is judged at the step S1109 that all the candidate named entities have been processed, then the candidate name entity lattice is output.

Figure 12:
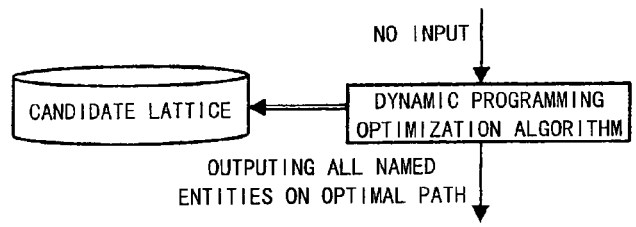
FIG. 12 is a schematic diagram showing the optimal path searching during the named entity recognition according to an embodiment of the present invention.

After obtaining the candidate name entity lattice, an optimal path searching procedure will be performed. FIG. 12 shows the schematic diagram for searching the optimal path. The kernel algorithm for searching the optimal path is to search one path having a maximum accumulative score by using dynamic programming methods, in which the nodes thereof are not overlapped in position. The output is all the named entities on this optimal path.

Next, the process performed by the dynamic programming algorithm will be described.

1. The operation object is the lattice formed by nodes. Each of nodes is attached with score information and information on the beginning and end positions thereof. If an end position of a node A is less than a beginning position of a node B, then the node A is called as a prior node of the node B, and the node B is called as a posterior node of the node A. There are one special beginning node and one special end node in the lattice, the beginning node is the prior node of all the other nodes, and the end node is the posterior node of all the other nodes. The scores of the beginning and end nodes are both 0.
2. The initial state is that a current node is the beginning node, the accumulative score of the current node is set to 0, and a source pointer of the node is set to NULL.
3. A node which has a minimum beginning position and is a posterior node of the current node is searched in the lattice, and is set as the current node.
4. For the current node, all the prior nodes of the current node are repetitively searched in the lattice, and during the process, the following sub-routines are performed:
    4.1 For an arbitrary prior node of the current node, a temporary path is created, and the score of the temporary path is equal to an accumulative score of the prior node plus a score of the current node.
    4.2 A maximum score among the scores of the temporary paths is found, and the maximum score of the temporary path is set as the accumulative score of the current node, and the source pointer of the current node is set to the prior node corresponding to the temporary path which has the maximum score.
    4.3 All the temporary paths are deleted.
5. If there are any unprocessed nodes in the lattice, it goes to the process 3; and otherwise, it goes to process 6.
6. Starting from the end node, tracing back with the source pointers of the respective nodes, all the nodes on the path are output.

Figure 13:
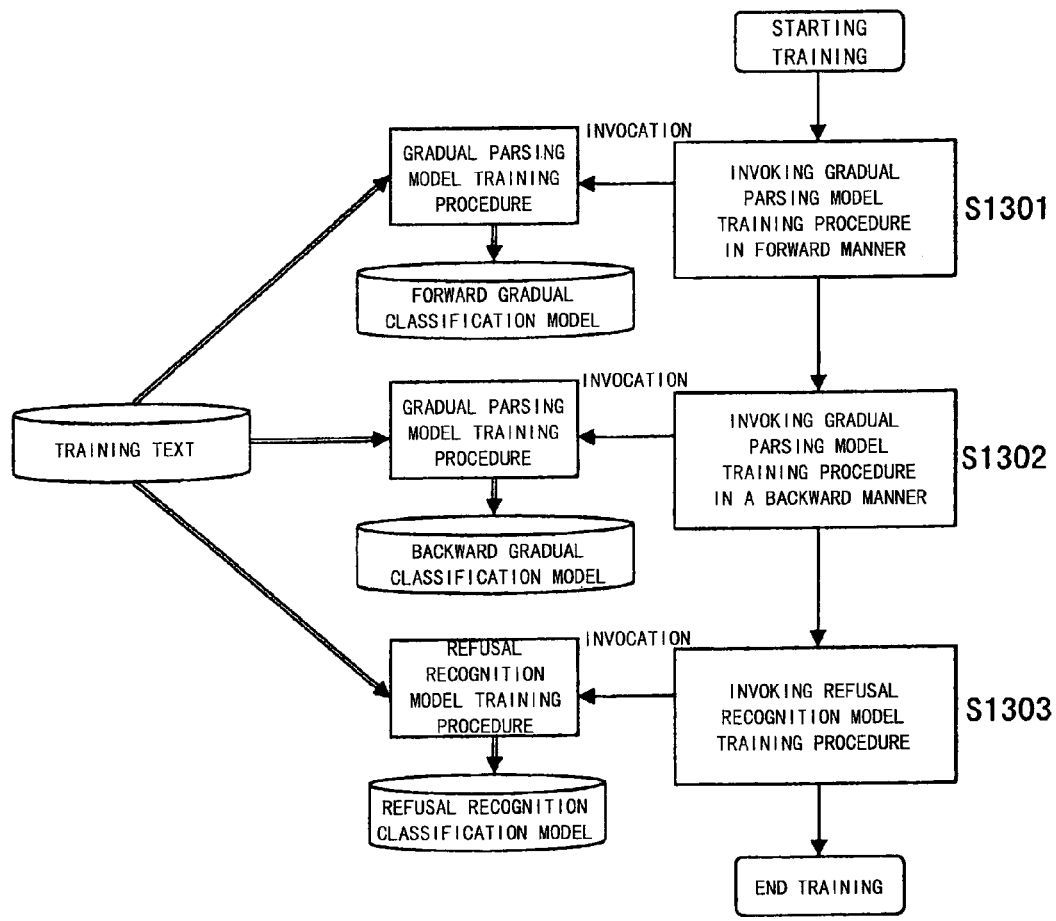
FIG. 13 is an overall flowchart of the off-line training procedure during the named entity recognition according to an embodiment of the present invention.

According to the present invention, the recognition system needs two kinds of models, i.e., the gradual classification model and the refusal recognition classification model. The training procedure may be an off-line process. FIG. 13 shows the overall flowchart of the off-line trainings. After the training is started, firstly, at step S1301, the gradual parsing model training procedure is invoked in a forward manner, and the forward gradual classification model is obtained through the corresponding processes described above. After that, at step S1302, the gradual parsing model training procedure is invoked in a backward manner, and the backward gradual classification model is obtained through the corresponding processes described above. Next, at step S1303, the refusal recognition model training procedure is invoked, and the refusal recognition classification model is obtained through the corresponding processes described above. When the respective classification models are obtained, the training is ended. In the course of invoking the respective training procedures, the system provides the training texts to each procedure.

Figure 14:
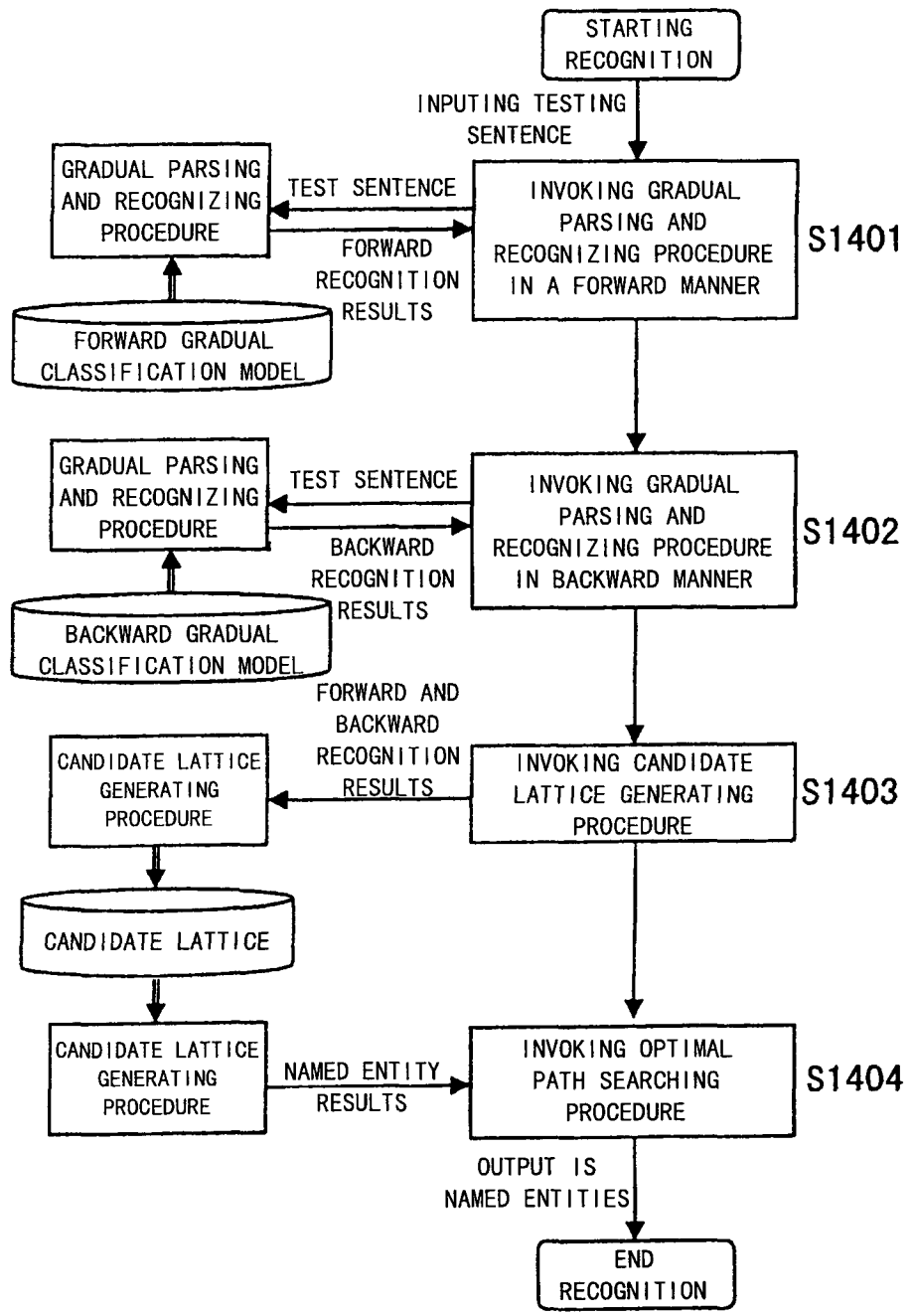
FIG. 14 is an overall flowchart of the on-line recognizing procedure during the named entity recognition according to an embodiment of the present invention.

After obtaining the gradual classification model and the refusal recognition classification model, the on-line system uses these two kinds of models to recognize the named entities for the input sentences. FIG. 14 shows the overall flowchart of the named entity recognition for the on-line system, which will be described as below.

After the recognition is started, the sentence to be tested is firstly inputted. Then, at step S1401, the gradual parsing and recognizing procedure is invoked in a forward manner for the forward recognition. During this procedure, the sentence to be tested is recognized according to the forward gradual classification model to obtain the forward recognition results. Thereafter, at step S1402, the gradual parsing and recognizing procedure is invoked in a backward manner for the backward recognition. During this procedure, the sentence to be tested is recognized according to the backward gradual classification model to obtain the backward recognition results. At step S1403, the system invokes the candidate named entity lattice generation procedure to generate the candidate named entity lattice. During this procedure, the candidate named entity lattice is generated according to the forward and backward recognition results. Next, at step S1404, the system invokes the optimal path searching procedure to calculate the optimal path according to the generated candidate named entity lattice. Finally, the named entities are output, and the process is ended.

Next, the named entity recognition system according to the embodiment of the present invention will be described. According to the present invention, the recognition of the named entities may include an off-line training system for the off-line training, and an on-line recognition system for the on-line testing and recognition.

Figure 15:
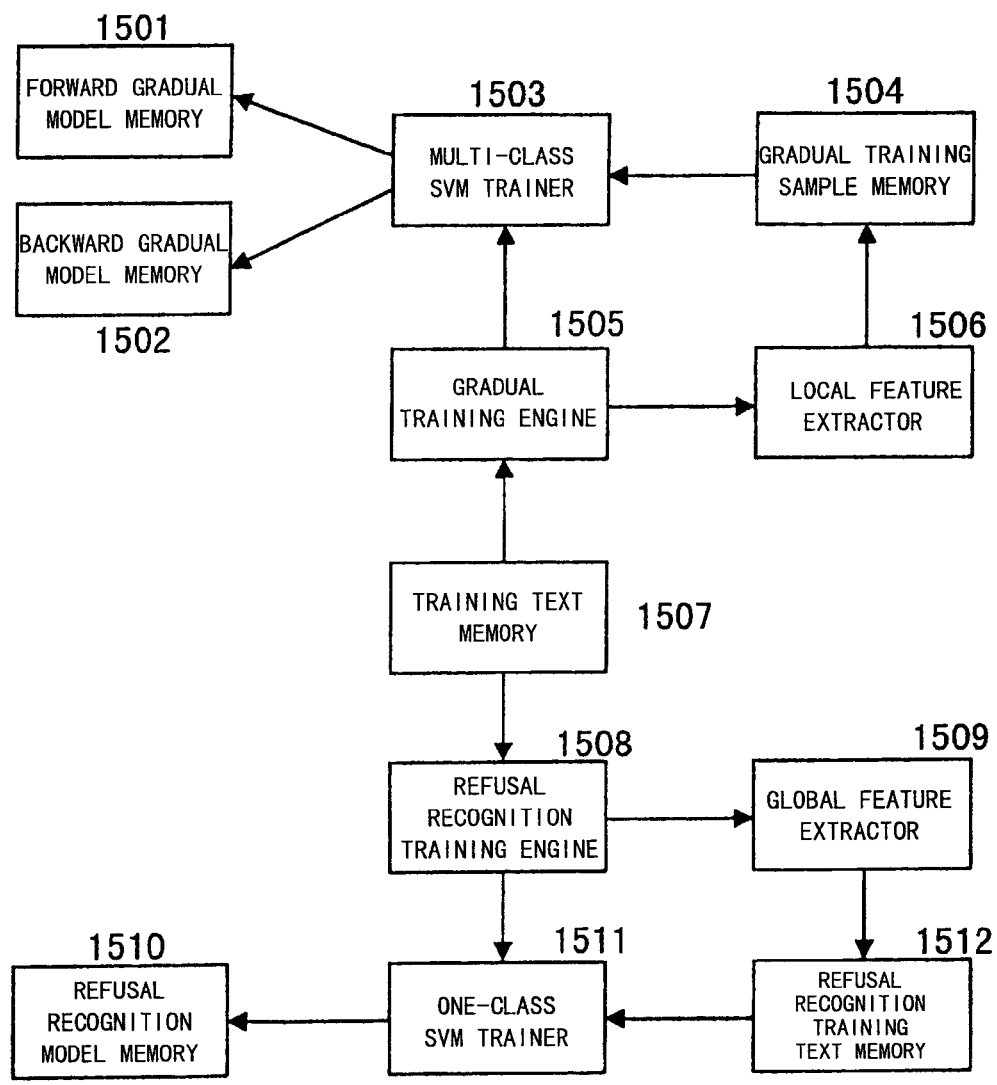
FIG. 15 is a block diagram showing an off-line training system for the named entity recognition apparatus according to an embodiment of the present invention.

FIG. 15 shows a named entity off-line training system according to an embodiment of the present invention. As shown in FIG. 15, the named entity off-line training system according to the present invention comprises a forward gradual model memory 1501, a backward gradual model memory 1502, a multi-class SVM trainer 1503, a gradual training sample memory 1504, a gradual training engine 1505, a local feature extractor 1506, a training text memory 1507, a refusal recognition training engine 1508, a global feature extractor 1509, a refusal recognition model memory 1510, a one-class SVM trainer 1511, and a refusal recognition training text memory 1512.

The operations of the named entity off-line training system will be described as below. The gradual training sample memory 1504 stores the training texts used by the system. When requiring a next sentence of the training text, the gradual training engine 1505 requests a training text to the training text memory 1507. For each training sentence, the gradual training engine 1505 triggers the local feature extractor 1506 to perform its operations, and passes the sentence of the training text to the local feature extractor 1506. Each time the local feature extractor 1506 generates a training sample represented by a feature vector and a sample token, the training sample is transmitted to the gradual training sample memory 1504 and is stored therein. For both the forward parsing and the backward parsing, the same gradual training sample memory 1504 is used since the forward parsing and the backward parsing are sequentially performed. After all the processes are completed for the feature extraction operation of the training text, the gradual training engine 1505 triggers the multi-class SVM trainer 1503 to perform its operations. The multi-class SVM trainer 1503 requests all the obtained training samples to the gradual training sample memory 1504 for training. When the multi-class SVM trainer 1503 generates the forward gradual classification model, the forward gradual classification model is transmitted to the forward gradual model memory 1501 and is stored therein. Similarly, when the multi-class SVM trainer 1503 generates the backward gradual classification model, the backward gradual classification model is transmitted to the backward gradual model memory 1502 and is stored therein.

When requiring a next sentence of the training text, the refusal recognition training engine 1508 requests a sentence of the training text. For each sentence of the training text, the refusal recognition training engine 1508 triggers the global feature extractor 1509 to perform its operations. Each time the global feature extractor 1509 generates a training sample represented by a feature vector and a sample token, the training sample is transmitted to the refusal recognition training text memory 1512 and is stored therein. After all the processes are completed for the feature extraction operation of the training text, the refusal recognition training engine 1508 triggers the one-class SVM trainer 1511 to perform its operations. The one-class SVM trainer 1511 requests all the obtained training samples to the refusal recognition training text memory 1512 for training. When the one-class SVM trainer 1511 generates the refusal recognition classification model, the refusal recognition classification model is transmitted to the refusal recognition model memory 1510 and is stored therein.

After the off-line training, the input sentences can be tested and recognized by the on-line system.

Figure 16:
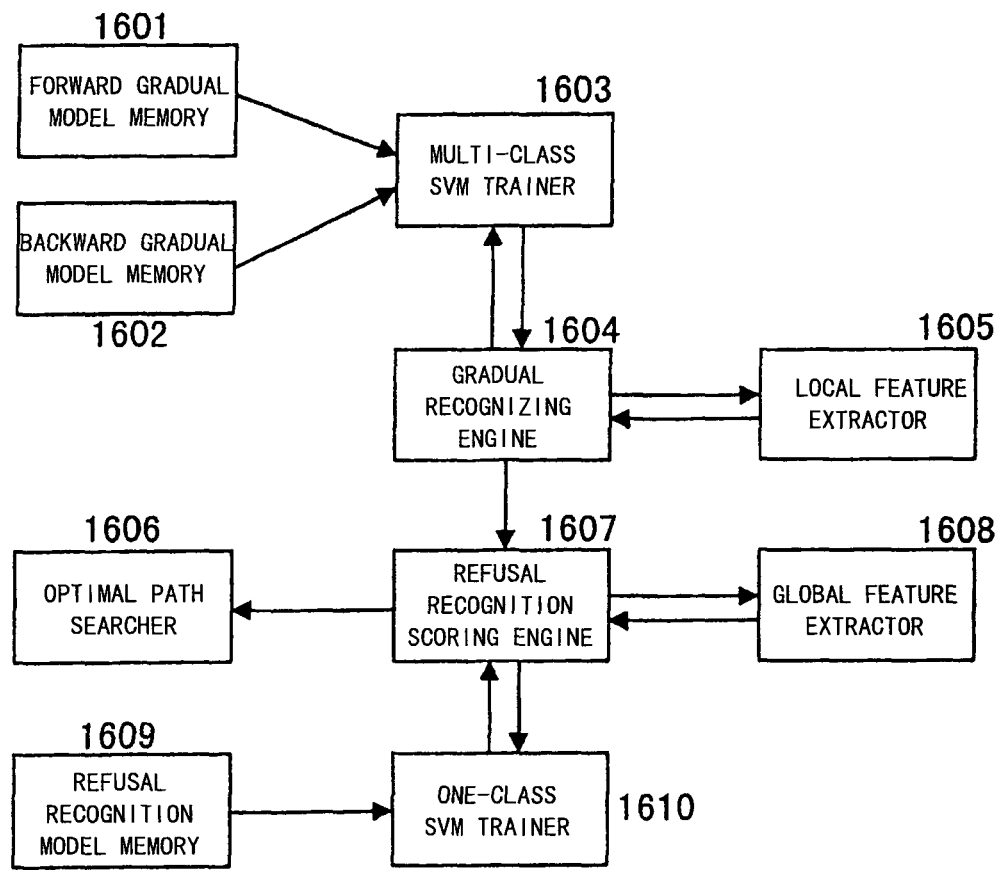
FIG. 16 is a block diagram showing an on-line recognition system for the named entity recognition apparatus according to an embodiment of the present invention.

FIG. 16 shows a named entity on-line recognition system according to an embodiment of the present invention. As shown in FIG. 16, the named entity on-line recognition system according to the present invention comprises a forward gradual model memory 1601, a backward gradual model memory 1602, a multi-class SVM recognizer 1603, a gradual recognizing engine 1604, a local feature extractor 1605, an optimal path searcher 1606, a refusal recognition scoring engine 1607, a global feature extractor 1608, a refusal recognition model memory 1609, and a one-class SVM trainer 1610.

The operations of the named entity on-line recognition system will be described below. After recognizing a sample of the input testing sentence, the gradual recognizing engine 1604 triggers the local feature extractor 1605, and provides the sentence of testing text to the triggered local feature extractor 1605. The triggered local feature extractor 1605 sends the local feature vector of the next sample gradually extracted (in a forward operation mode and a backward operation mode respectively) back to the gradual recognizing engine 1604. When obtaining the next sample of the testing sentence, the gradual recognizing engine 1604 triggers the multi-class SVM recognizer 1603 to perform its operations, and transmits the feature vector of the sample to the multi-class SVM recognizer 1603. In the forward operation mode, the multi-class SVM recognizer 1603 requests and obtains the forward gradual classification model from the forward gradual model memory 1601 for recognizing the input sample, and then sends the recognition results back to the gradual recognizing engine 1604. The multi-class support vector machine recognizing device uses the multi-class classification model to test the input local feature vector so as to obtain the type token thereof. A string of beginning and continuing tokens belonging to the same kind of named entity forms one named entity.

After obtaining the recognition results of a sample, the gradual recognizing engine 1604 triggers the local feature extractor 1605 again. After that, the local feature extractor 1605 performs the operations as described above. The operations in the backward operation mode are similar hereto.

After obtaining all the named entities obtained by the forward and backward parsing and recognitions, the gradual recognizing engine 1604 transmits these results to the refusal recognition scoring engine 1607. For each candidate named entity obtained by the forward and backward parsing, the refusal recognition scoring engine 1607 triggers the global feature extractor 1608, and transmits the contexts of the candidate to the global feature extractor 1608. The global feature extractor 1608 sends the extracted global feature vector back to the refusal recognition scoring engine 1607. When obtaining the feature vector of the candidate named entity, the refusal recognition scoring engine 1607 triggers the one-class SVM trainer 1610, and transmits the feature vector of the candidate to the one-class SVM trainer 1610. The one-class SVM trainer 1610 requests the refusal recognition classification model to the refusal recognition model memory 1609, and recognizes the input candidate named entities, and sends the recognition results (reliable scores) back to the refusal recognition scoring engine 1607. The one-class support vector machine recognizing device uses the one-class classification model to test the input global feature vectors so as to obtain its testing scores. The different thresholds are substrates form the testing scores so as to obtain the refusal recognition scores. The optimal path searching is performed according to the refusal recognition scores, and those candidate named entities on the optimal path are accepted.

After obtaining the recognition results (reliability scores) for the candidates, the refusal recognition scoring engine 1607 determines one of the different thresholds according to the positional relationship between the forward and backward parsing results, substrates the threshold from the reliability scores so as to obtain the refusal recognition scores, and triggers the optimal path searcher 1606. After that, the refusal recognition scoring engine 1607 transmits the candidates, their positions and the refusal recognition scores to the optimal path searcher 1606. When obtaining one candidate, its position and the refusal recognition score, if the score is larger than 0, the optimal path searcher 1606 then adds the candidate, its position and the refusal recognition score into the candidate named entity lattice. The candidate named entities will be accepted or refused according to the calculated refusal recognition scores.

After calculating the refusal recognition scores of all the candidates in one input sentence, the optimal path searcher 1606 starts the optimal path searching for the optimal path having a maximum sum of the refusal recognition scores, and stores the named entities on the optimal path as the final output of the system.

The named entity off-line training system and the on-line recognition system of the present invention can be embodied with computers. If they are embodied with computes, the programs for implementing the forward gradual model memory 1501, the backward gradual model memory 1502, the multi-class SVM trainer 1503, the gradual training sample memory 1504, the gradual training engine 1505, the local feature extractor 1506, the training text memory 1507, the refusal recognition training engine 1508, the global feature extractor 1509, the refusal recognition model memory 1510, the one-class SVM trainer 1511, and the refusal recognition training text memory 1512, as well as the forward gradual model memory 1601, the backward gradual model memory 1602, the multi-class SVM recognizer 1603, the gradual recognizing engine 1604, the local feature extractor 1605, the optimal path searcher 1606, the refusal recognition scoring engine 1607, the global feature extractor 1608, the refusal recognition model memory 1609, and the one-class SVM trainer 1610 can be stored in disks, semiconductor memories or other recording media. The computer reads the above programs. The programs control the operations of the computer, and implement the above devices thereon.

According to the method and system for recognizing a named entity included in natural language, a method for recognizing a named entity according to a global feature is used so that those unreliable candidate named entities, having unreliable beginning borders or impossible end border, generated by the gradual named entity recognition method can be refused for recognition. Additionally, the character-based feature extraction can prevent the influences due to the erroneous word segmentation. The recognition performance of the named entities can be improved by combining the forward and backward parsing results.

Although the present invention is illustrated with reference to the preferred embodiments thereof, it can be understood by those skilled in the art that various changes, substitutions and alters to the present invention are possible without departing from the spirit and scope of the present invention. Therefore, the present invention is not limited to the above embodiments but only limited by the following claims and the equivalents thereof.

What is claimed is:

1. A method for recognizing a named entity included in Chinese character strings, comprising the steps of:
    recognizing candidate named entities included in the Chinese character strings by a gradual recognizer;
    extracting the recognized candidate named entities by a refusal recognizer based on all global features of one or more Chinese characters or words contained in the candidate named entities, wherein the global features indicate information of the one or more Chinese characters or words including context, length, part-of-speech, and type of the one or more Chinese characters or words;
    testing said candidate named entities by using said global features; and
    if a score of the testing is larger than a predetermined threshold, accepting said candidate named entity, otherwise, refusing the recognition thereof;
    further comprising a step of forming the candidate named entities recognized by the refusal recognizer as a lattice on which each candidate named entity is attached with a refusal recognition score, and a step of searching for a path having a maximum sum of the refusal recognition scores on the lattice as an optimal path, and selecting the candidate named entities on the optimal path as the final result.

2. The method according to claim 1, wherein the step of testing said candidate named entities by using said global features includes steps of using said global features as an input and testing said candidate named entities by using a one-class support vector machine which is the refusal recognizer.

3. The method according to claim 1, wherein said step of gradually recognizing includes a forward gradual parsing training step and a backward gradual parsing training step so as to generate a forward gradual classification model and a backward gradual classification model respectively.

4. The method according to claim 1, wherein said refusal recognition score of each candidate named entity is equal to the score of the testing minus said predetermined threshold.

5. A method for recognizing a named entity included in Chinese character strings, comprising the steps of:
    extracting local features of words or characters included in a center of a feature window by using the feature window;
    on the basis of a classification model obtained after training a gradual parsing model based on further Chinese character strings, gradually parsing and recognizing the Chinese character strings so as to obtain information on positions and types of candidate named entities;
    extracting global features of the candidate named entities included in the center of the feature window by using the feature window, wherein global features indicate information of one or more Chinese characters or words including context, length, part-of-speech, and type of the one or more Chinese characters or words, and;
    performing a refusal recognition process by a refusal recognizer for the candidate named entities using all of the extracted global features; and
    generating a candidate named entity lattice from the refusal-recognition-processed candidate named entities, and searching for an optimal path;
    wherein each candidate named entity on the lattice is attached with a refusal recognition score, and the optimal path is a path having a maximum sum of the refusal recognition scores on the lattice, and selecting the candidate named entities on the optimal path as the final result.

6. The method according to claim 5, wherein said gradual parsing model training step includes using a forward gradual classification model obtained through performing forward gradual parsing model training, and a backward gradual classification model obtained through performing backward gradual parsing model training to perform the training.

7. The method according to claim 6, wherein in said refusal recognition processing step, if the forward and backward parsing processes obtain the same candidate named entity, then the candidate named entity is evaluated with a one-class support vector machine and an identical candidate threshold.

8. The method according to claim 6, wherein in said refusal recognition processing step, if one parsing process obtains one candidate named entity and the other parsing process does not obtain any other named entity which intersects with said one candidate named entity in position, then said one candidate named entity is evaluated with a one-class support vector machine and a free threshold.

9. The method according to claim 6, wherein in said refusal recognition processing step, if the forward parsing process obtains one candidate named entity and the backward parsing process obtains another candidate named entity, and these two candidates intersect with each other in position and have the same type, then at most two new candidates of the same type are generated according to the overlapping conditions, and then the at most four candidates are evaluated with a one-class support vector machine and an overlapping candidate threshold.

10. The method according to claim 6, wherein in said refusal recognition processing step, if the two parsing processes obtain two candidate named entities which intersect with each other in position and have different types, then the two candidates are evaluated with a one-class support vector machine and a forward and backward conflicting candidate threshold.

11. The method according to claim 5, wherein said gradual parsing and recognizing step includes a step of extracting the local feature of the extracted words or characters, and parsing the extracted words or characters based on the extracted local features.

12. The method according to claim 11, further comprising a step of obtaining a multi-dimensional vector representing all features of the candidate named entity by a feature extracting module, and classifying the obtained multi-dimensional vector by using a gradual classification model.

13. The method according to claim 5, wherein the refusal recognition processing step includes a step of extracting the global feature of characters in the candidate named entity, and performing the refusal recognition process for the obtained global features by using the model obtained through learning on a one-class classifier.

14. The method according to claim 5, wherein the refusal recognition processing step includes a step of extracting the candidate named entities by a refusal recognizer, calculating precision scores of these candidate named entities, and accepting or refusing the candidate named entities according to the calculated scores.

15. The method according to claim 5, wherein a refusal recognizer obtained by using different training sets for different kinds of named entities is used in the refusal recognition processing step.

16. The method according to claim 5, wherein the refusal recognition processing step uses a one-class support vector machine to test the candidate named entities, if a score of the testing is larger than a predetermined threshold, accepting said candidate named entity, otherwise, refusing said candidate named entity.

17. An off-line training system for recognizing a named entity included in Chinese character strings, comprising:
  a local feature extracting device for having a supplied training text generate a named entity training sample denoted by a feature vector and a sample token;
  a multiple-class support vector machine training device for training the training text to generate a gradual classification model;
  a global feature extracting device for having the named entity training sample generate a refusal recognition training sample denoted by a feature vector and a sample token based on all global features of one or more Chinese characters or words contained in the named entity training sample, wherein the global features indicate information of the one or more Chinese characters or words including context, length, part-of-speech, and type of the one or more Chinese characters or words;
  a one-class support vector machine training device for refusal-recognition-training the obtained refusal recognition training sample to generate a refusal recognition classification model, wherein each named entity training sample is attached with a refusal recognition score resulting in a lattice of named entity training samples, and an optimal path having maximum sum of the refusal recognition scores on the lattice is determined, and the named entity training samples on the said optimal path are accepted as the final result;
  a training sample memory for storing the training texts used during the training.

18. An on-line recognizing system for recognizing a named entity included in Chinese character strings, comprising:
  a local feature extracting device for having a provided training sample generate a local feature vector;
  a multiple-class support vector machine recognizing device for recognizing the input text according to the local feature vector of the sample to obtain candidate named entities;
  a global feature extracting device for extracting a global feature vector of the candidate named entities and the contexts thereof based on all global features of one or more Chinese characters or words contained in the candidate named entities, wherein the global features indicate information of the one or more Chinese characters or words including context, length, part-of-speech, and type of the one or more Chinese characters or words; and
  a one-class support vector machine recognizing device for recognizing the input candidate named entities according to the global feature vector of the sample,
  wherein said multiple-class support vector machine recognizing device uses a multiple-class classification model to test the input local feature vector so as to obtain its type token, and forms a candidate named entity according to a series of beginning and continuing tokens belonging to the same type of named entity; and said one-class support vector machine recognizing device uses a one-class classification model to test the input global feature vector so as to obtain its testing score, substrates different thresholds from the obtained testing score to obtain a refusal recognition score, searches for an optimal path according to the refusal recognition score, and accepts the candidate named entities on the optimal path,
  further comprising: an optimal path searching device for searching for an optimal path having a maximum sum of the refusal recognition scores according to the positions and the refusal recognition scores of the candidate named entities.

19. The system according to claim 18, further comprising:
  a refusal recognition scoring device for determining one of the different thresholds according to the candidate named entity recognition results and the positional relationships among the candidate named entities obtained by said one-class support vector machine recognizing device so as to calculate a refusal recognition score, and accepting or refusing the candidate named entity according to the calculated refusal recognition score.

* * * * *